United States Patent Office 3,103,585
Patented Sept. 10, 1963

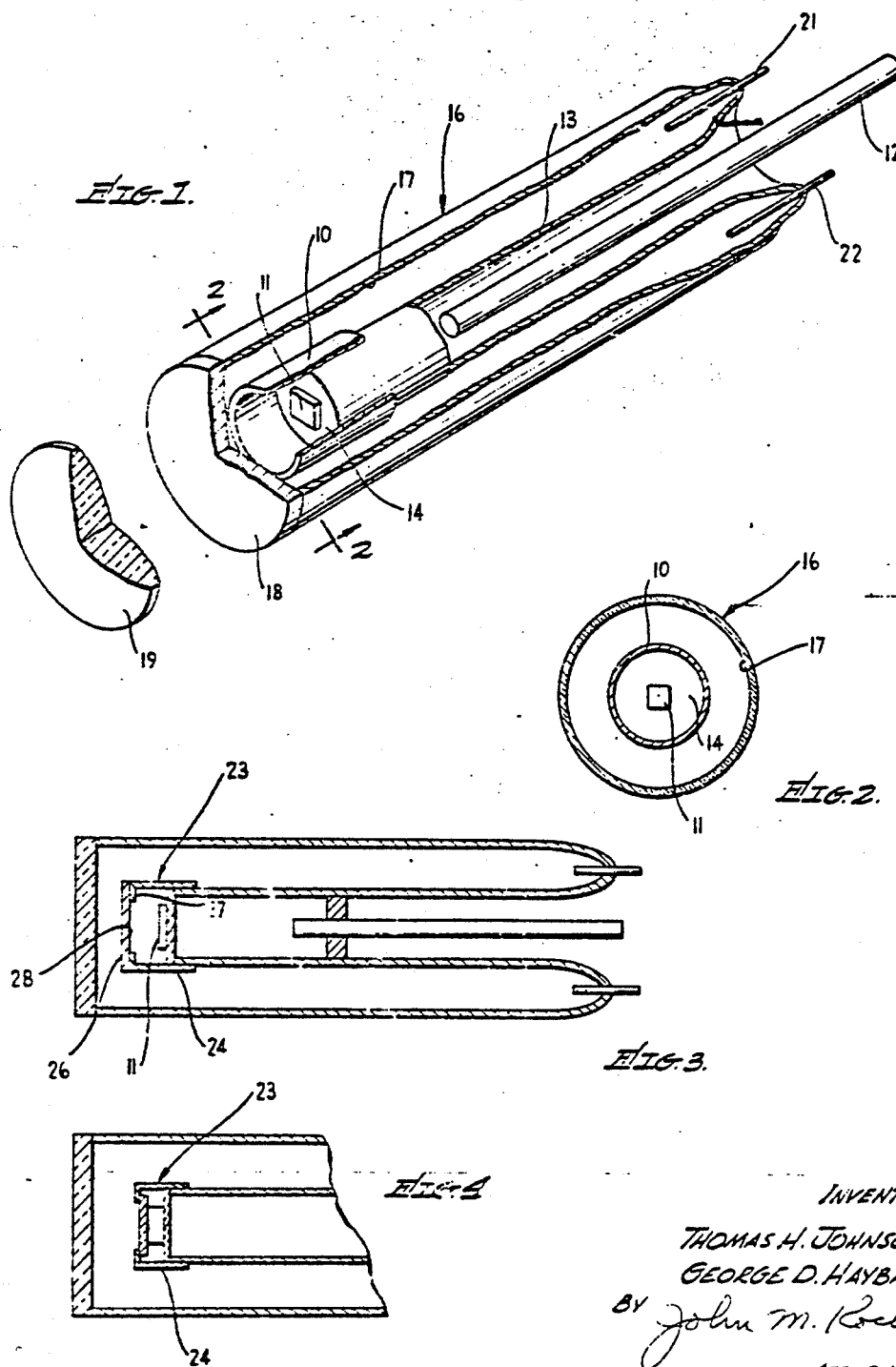

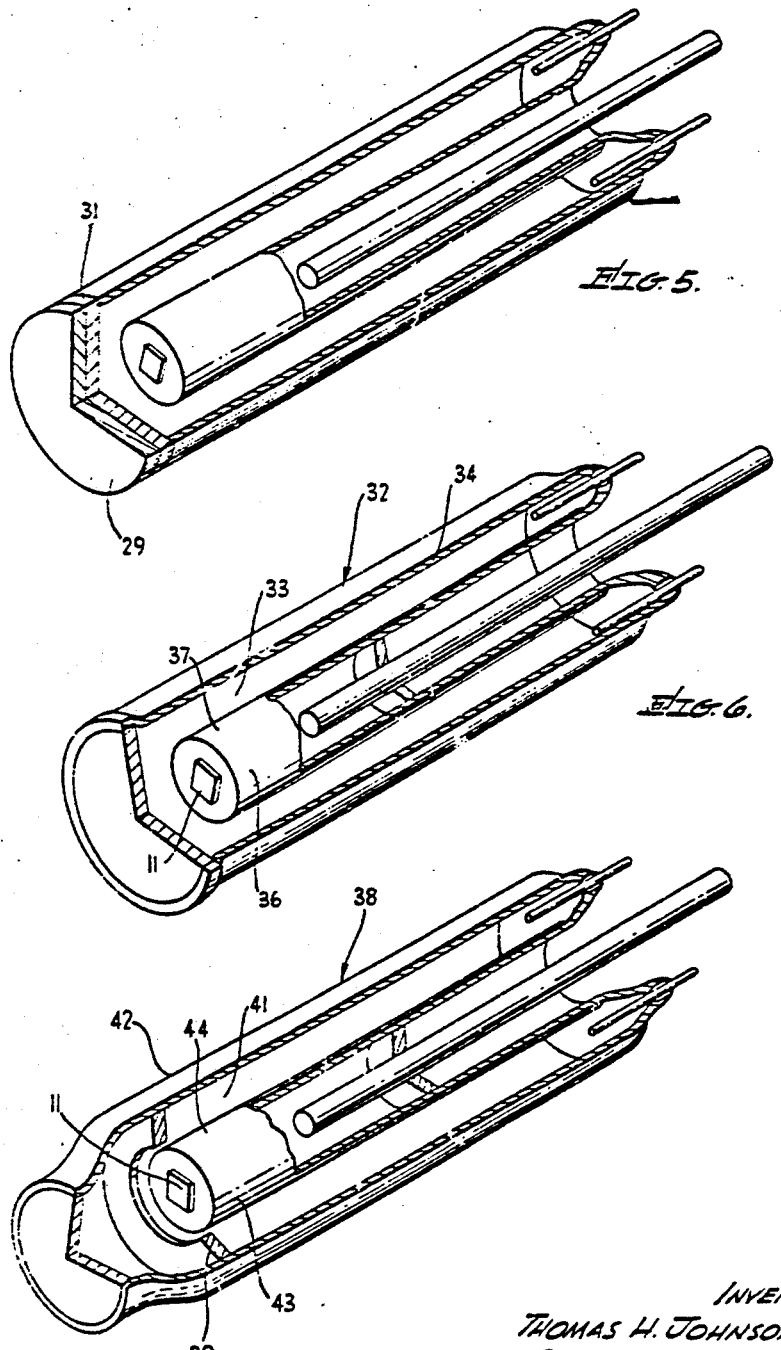

3,103,585
RADIATION SHIELDING FOR INFRARED
DETECTORS
Thomas H. Johnson, Santa Barbara, Calif., and George
D. Hayball, Innsbruck, Austria, assignors to Santa
Barbara Research Center, Goleta, Calif., a corporation
of California
Filed Dec. 22, 1959, Ser. No. 862,443
3 Claims. (Cl. 250—83)

This invention relates to an infrared detector cell, and particularly to such a cell wherein the detectivity and responsivity thereof are improved by the judicious use of certain shielding, filtering or reflecting devices in combination with the cell.

It is known in the prior art that infrared detector cells can be improved by shielding the same from radiation emanating from the environment of the cell. Generally this is attempted by the use of a silver mirror on the external walls of a dewar flask surrounding the detector cell. The disadvantages of these prior art methods reside in the fact that they are not designed primarily to shield the infrared detector cell per se, but mainly to reduce the heat load placed on the contents of the dewar flask by the external environment of the flask. Thus, these prior art externally silvered flasks do not efficiently shield the infrared detector cell from radiation emitted from sources inside the dewar flask and distributed in the environment of the cell itself. In addition, such prior art silvering techniques fail to reduce the amount of spurious radiation incorporated in the field of view of the infrared detector cell.

Experiments performed on the sensitivity of lead selenide infrared detector cells which were cooled to the boiling temperatures of liquid nitrogen at atmospheric pressures have shown that the presence of spurious infrared radiation degraded the sensitivity of the detector cells. Reliable evidence has shown that radiation in the wavelength region of sensitivity of the detector cells is active in producing the observed degrading effect. Over a considerable range of radiation level, it was found that the sensitivity of the lead selenide detector cells decreased as the square root of the light level for the most sensitive cells. The dependence of cell sensitivity on the square root of the light level is predicted on the basis of fluctuation theory. This is a fundamental limit which is applicable to all infrared detector cells provided they are sufficiently sensitive. Therefore, to improve the sensitivity of detector cells of high sensitivity it is necessary to provide a means of restricting the amount of radiation incident on the cells, particularly radiation which is not in the wavelength region of the signal radiation, but is in the region of the sensitivity of the infrared detector cells.

Accordingly, it is an important object of our invention to provide radiation control means which will protect an infrared detector cell from undesirable radiation.

Another object is to provide an infrared detector cell having increased detectivity and responsivity as a result of the use of means in combination with the cell for preventing the impingement of spurious infrared radiation upon the cell.

A further object is to provide an infrared detector cell which when employed in an infrared system will considerably improve the target versus background discrimination capability of the system.

Additional objects will become apparent from the following description of our invention which is given primarily for purposes of illustration and not limitation.

Briefly stated in general terms, the objects of our invention are attained by providing a radiation sensitive cell comprising a cooled opaque shield means mounted around the detector cell for the purpose of excluding from impingement thereon environmental radiation not in the optical field of view of the cell. In addition, cooled, partially transmitting filter means preferably are mounted in the optical field of view of the cell for the purpose of absorbing all radiation other than a signal radiation in the wavelength region of the sensitivity of the detector cell. Further improvement in the performance of the cell is accomplished by the use of an interference type filter means mounted in the optical field of view of the cell for the purpose of preventing ambient radiation from reaching the cell. This interference type filter has the property of reflecting certain wavelength regions of radiation away from the cell and transmitting the unreflected radiation to the cell. Additional reduction of ambient radiation is accomplished by the use of silvered jacket means or polished metal surfaces mounted around the detector cell so that the cell and the cool mount thereof "see themselves."

A more detailed description of specific embodiments of the invention is given below with reference to the drawings wherein:

FIG. 1 is a perspective view showing an infrared detector cell assembly including a cooled opaque shield mounted around the cell, a transparent window and lens combination positioned in the optical field of view of the cell, and thermal insulating and cooling means cooperatively associated with the cell;

FIG. 2 is a cross-sectional view taken as at line 2—2 of FIG. 1 showing the relationship between the cell and the shield;

FIG. 3 is a partial longitudinal sectional view of an infrared detector cell showing the use of a cooled, partially transmitting filter mounted over the cell and across a major portion of the optical field of view thereof;

FIG. 4 is a similar view showing an alternative arrangement with the filter inside the shield and in contact with the cell;

FIG. 5 is a perspective view showing a detector package which includes the use of an interference type filter as a radiation shield;

FIG. 6 is a perspective view showing the use of a metal walled dewar with polished internal surfaces arranged so that the cooled detector will "see-itself" only; and FIG. 7 is a view similar to that of FIG. 3, showing an infrared detector cell mounted in a swaged metal envelope provided with a baffle and highly polished internal surfaces.

The shields employed in this invention are effective in improving the sensitivity of infrared detector cells in accordance with the general description given above. In view of the fact that only the radiation which is in the optical field of view contains the signal radiation, radiation directed at the cell from angles outside those of the signal radiation can be eliminated. In accordance with one embodiment of this invention, a cylindrical, open-ended or partially constricted, opaque shield 10, cooled to a sufficiently low temperature to prevent the emission of undesirable radiation therefrom, is employed as shown in FIG. 1. Ideally, this shield should be blackened internally to prevent reflection of undesirable radiation to the detector 11. The exterior surface of the shield 10 preferably should be made to have a highly reflecting finish to prevent heat loss from the shield. Also, the shield 10 should have good thermal contact to the refrigerant supplied through coolant tube 12 to the interior of cooled tube 13.

The coolant, such as liquid nitrogen, or other liquefied gases, during the period of operation of the cell, is supplied through coolant tube 12 to the interior of hollow tube 13, which is provided with an end wall 14. The end wall 14 serves as a support base for detector cell 11. It will be seen that the shield 10 and detector cell 11 are cooled to substantially the same temperature during operation of the cell because of the intimate contact established between support base 14, shield 10 and cell 11.

The detector package shown in FIG. 1 also includes a vacuum jacket or dewar flask 16 having an outer jacket 17 and an inner jacket consisting of cooled tube 13. One end of outer jacket 17 is provided with a transparent window 18 sealed integrally onto the outer jacket. Adjacent window 18 is mounted a lens 19 in the optical field of view of cell 11 to focus radiation, including signal radiation, upon the infrared sensitive areas of the cell. The other end of outer jacket 17 is provided with two spaced electrodes 21 and 22. These electrodes are sealed in the wall of outer jacket 17 and are electrically connected to the infrared sensitive areas of cell 11 (not shown) by leads (not shown) in a conventional manner.

In the embodiment shown in FIG. 3, a shield 23 is tightly fitted over the end of coolant tube 13 at cylindrical sidewalls 24 thereof so that the cooled-partially transmitting filter 26 mounted on the shield is closely adjacent the outer surface of detector cell 11, and across the optical field of view thereof. The flanged, annular end wall 27 of the shield 23 is provided with a central opening or perforation 28 for the admission of the desired signal radiation to the sensitive area of the cell 11. When the cooled filter 26 is placed on top of and in contact with the sensitive area of detector cell 11, as best shown in FIG. 4, it not only serves to increase the sensitivity of the detector cell, but also provides an additional cooling path to the infrared sensitive film of the cell. As a result of this additional cooling feature, detector cell 11 can be operated with higher bias currents, and with consequent increased detector responsivity. The filters of this invention preferably are made of thin quartz about 0.008 inch to about 0.015 inch thick, but can also be made of various infrared transparent glasses with long wave-length cut-off characteristics. The filter and cut-off characteristics chosen depend upon the spectral sensitivity of the detector cell. For example, in the case of a lead selenide cell a filter having a cut-off in the 4 to 5 micron region should be chosen.

The embodiment shown in FIG. 5 illustrates an additional method of shielding against spurious radiation which consists of placing an interference type filter 29 in the optical field of view of the detector cell 11. The interference type filter 29 is characterized by its ability to transmit certain wavelengths of light and reject others by reflection rather than by absorption. Therefore, it is not necessary to cool the interference type filter in order to use it as a radiation shield because it is not a self-emitter. The transmission properties of this filter are adjusted so that it transmits the signal radiation, but reflects all other radiation in the region of spectral sensitivity of the detector. This filter is prepared by the evaporation of multiple layers of suitable metallic salts according to techniques well known in the art. This interference type filter 29 can be mounted externally of the conventional transparent window 31, as shown in FIG. 5, provided that the window exhibits a high transparency over the entire region of spectral sensitivity of the detector. If the window 31 exhibits partial absorption in this region, as does sapphire, which usually is used with cooled lead selenide detector cells, then it is necessary to either place the interference filter 29 inside the window or to place a second sapphire disc (not shown) in thermal contact with the cooled detector in order to absorb the radiation emitted by the sapphire window.

A further method of preventing ambient radiation from reaching the detector cell consists of placing a suitable reflector around the detector cell so that it and cooled mount 14 thereof "see themselves." This can be accomplished as shown in FIG. 6, by using a metal dewar 32 with polished internal surface 33 inside outer jacket 34 and polished metal surface 36 outside cooled tube 37.

A still further embodiment of the invention employing a detector cell 11 with a swaged metal envelope 38 and a baffle 39 is shown in FIG. 7. Baffle 39 prevents radiation coming from the lower end of the detector package from impinging upon cell 11. The swaged metal envelope 38 is highly polished on the inside surface 41 of the outer jacket 42 and also on the outside surface 43 of the cooled tube 44. The baffle 39 is mounted inside the envelope 38 and around the cooled tube 44 adjacent the enclosed end thereof, as shown. This embodiment illustrates the use of cold or warm reflecting filters, such as baffle 39 and polished walls 41 and 43, to improve the detector cell sensitivity without the use of silvered glass surfaces in the dewar flask. It will be noted that a distinction is made here between the use of silvered glass surfaces on one hand and the use of highly polished metal walls on the other.

Considerable improvement in the performance of infrared detector cells has been observed while using the above-discussed types of filters and has been demonstrated on cooled lead selenide detector cells. Improvements in sensitivity of a factor of about seven have been achieved with the cooled opaque geometrical shields. One detector package containing geometrical shielding and cold quartz as a partly transmitting filter showed an improvement of a factor of almost ten in sensitivity to radiation at 4 microns wavelength. A 60% improvement in sensitivity to radiation at 3.6 microns was achieved by merely placing an interference filter over the window of a detector package.

The present invention is applicable to all cooled detector cells which are limited by ambient radiation. Such detector cells at present are lead selenide, lead sulfide, lead telluride, indium antimonide and impurity type germanium and silicon detector cells, at least in their most sensitive forms. Among the advantages obtained by the use of this invention are the following. Improvements in the sensitivity of detector cells are attained by increasing the signal to noise ratio of all photon noise limited detector cells. The signal output, or responsivity of detector cells are increased by an increase in the time constants of the cells through the use of shielding. This reduces the amplification needed in the auxiliary electronics employed and helps overcome system or amplifier noises. Infrared system sensitivity is improved by improving detector cell sensitivity through shielding which provides a greater reduction in ambient radiation than in signal radiation. The several methods of providing radiation shielding for the detector as outlined above permits the incorporation of a degree of detector shielding in any type of detector package regardless of the design requirements.

It will be apparent that many variations in the materials, combinations of materials and methods of constructing the composite cell of our invention will occur to a person skilled in the art. The materials and methods given hereinabove are presented primarily for descriptive and illustrative purposes and we intend our invention to be limited only by the scope of the appended claims.

What is claimed is:

1. A radiation sensitive cell comprising support means for a detector cell mounted on the support means, a vacuum jacket mounted around the detector cell and providing an evacuated atmosphere for the cell, an opaque geometrical shield means mounted around the detector cell for excluding radiation from the detector cell which is not in an optical field of view of the cell, filter means attached in heat conducting relationship to the support means for the detector cell and mounted in the evacuated atmosphere of the vacuum jacket and in the field of view of the cell for transmitting a signal radiation but absorbing all other radiation in the wavelength region of sensitivity of the detector cell, and cooling means for maintaining the detector cell, the filter means and the geometrical shield means at subambient temperatures.

2. A radiation sensitive cell comprising support means for a detector cell mounted on the support means, a vacuum jacket mounted around the detector cell and providing an evacuated atmosphere for the cell, opaque shield means mounted around the detector cell for excluding radiation from the detector cell which is not in an optical field of view of the cell, filter means attached in heat conducting relationship to the support means for the detector cell and mounted in the evacuated atmosphere of the vacuum jacket and in the field of view of the cell for transmitting a signal radiation but absorbing all other radiation in the wavelength region of sensitivity of the detector cell, polished internal surface means surrounding the detector cell for preventing ambient radiation from reaching the detector cell, and cooling means for maintaining the detector cell, the filter means and the geometrical shield means at subambient temperatures.

3. A radiation sensitive cell comprising support means for a detector cell mounted on the support means, a vacuum jacket mounted around the detector cell and providing an evacuated atmosphere for the cell, opaque shield means mounted around the detector cell for excluding radiation from the detector cell which is not in an optical field of view of the cell, filter means attached in heat conducting relationship to the support means for the detector cell and mounted in the evacuated atmosphere of the vacuum jacket and in the field of view of the cell for transmitting a signal radiation but absorbing all other radiation in the wavelength region of sensitivity of the detector cell, silvered jacket means mounted around the detector cell for preventing ambient radiation from reaching the detector cell, interference type filter means attached in heat conducting relationship to the support means for the detector cell and mounted in the evacuated atmosphere of the vacuum jacket and in the field of view of the cell for preventing ambient radiation from reaching the detector cell, and cooling means for maintaining the detector cell and the partially transmitting filter means at subambient temperatures.

References Cited in the file of this patent
UNITED STATES PATENTS

| | | |
|---|---|---|
| 2,544,261 | Gibson | Mar. 6, 1951 |
| 2,692,950 | Wallace | Oct. 26, 1952 |
| 2,765,411 | Kerr | Oct. 2, 1956 |
| 2,815,452 | Mertz | Dec. 3, 1957 |
| 2,816,232 | Burstein | Dec. 10, 1957 |
| 2,844,737 | Hahn | July 22, 1958 |
| 2,951,658 | Jones et al. | Sept. 6, 1960 |
| 2,973,434 | Roberts | Feb. 28, 1961 |
| 2,975,284 | Osborne | Mar. 14, 1961 |
| 2,984,747 | Walker | May 16, 1961 |
| 3,034,010 | Garbuny | May 8, 1962 |
| 3,062,959 | Sclar | Nov. 8, 1962 |